United States Patent
Kim et al.

(10) Patent No.: US 11,782,782 B2
(45) Date of Patent: Oct. 10, 2023

(54) MEMORY SYSTEM AND DATA PROCESSING SYSTEM

(71) Applicant: SK hynix Inc., Gyeonggi-do (KR)

(72) Inventors: Seung Hun Kim, Gyeonggi-do (KR); Young Kyu Jeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/554,169

(22) Filed: Dec. 17, 2021

(65) Prior Publication Data

US 2022/0334905 A1    Oct. 20, 2022

(30) Foreign Application Priority Data

Apr. 20, 2021   (KR) .................. 10-2021-0051191
Jul. 20, 2021   (KR) .................. 10-2021-0094761

(51) Int. Cl.
| | | |
|---|---|---|
| *G06F 11/00* | (2006.01) | |
| *G06F 11/07* | (2006.01) | |
| *G06F 13/42* | (2006.01) | |
| *G06F 21/60* | (2013.01) | |

(52) U.S. Cl.
CPC ........ *G06F 11/079* (2013.01); *G06F 11/0727* (2013.01); *G06F 11/0751* (2013.01); *G06F 11/0787* (2013.01); *G06F 13/4221* (2013.01); *G06F 13/4234* (2013.01); *G06F 21/602* (2013.01); *G06F 2213/0036* (2013.01)

(58) Field of Classification Search
None
See application file for complete search history.

(56) References Cited

U.S. PATENT DOCUMENTS

| | | | |
|---|---|---|---|
| 2012/0216079 A1* | 8/2012 | Fai ................. | G06F 11/362 |
| | | | 714/E11.055 |
| 2015/0205711 A1* | 7/2015 | Dhangar ............ | G06F 11/0748 |
| | | | 714/38.1 |
| 2017/0099178 A1* | 4/2017 | Satoh .............. | H04L 41/0686 |
| 2019/0205197 A1 | 7/2019 | Hartman | |
| 2023/0004320 A1* | 1/2023 | Choi ............... | G06F 3/0625 |

OTHER PUBLICATIONS

Google Scholar/Patents search—text refined (Year: 2023).*
Frror history mode (1Ch), SCSI Commands Reference Manual (Seagate), Oct. 2016, 148-153, 100293068, Rev. J, Seagate Technology LLC.

* cited by examiner

*Primary Examiner* — Christopher S McCarthy
(74) *Attorney, Agent, or Firm* — IP & T GROUP LLP

(57) ABSTRACT

A data processing system may include: a memory system including an error history region, the memory system suitable for storing in the error history region, error history data related to an internal error, and a host suitable for obtaining the error history data from the memory system by providing the memory system with an error history read command, performing failure analysis of the memory system on the basis of the obtained error history data, and controlling the memory system to clear at least a portion of the error history region by providing the memory system with an error history clear command, wherein the error history region is a memory region that is not able to be accessed with a logical address used by the host.

15 Claims, 14 Drawing Sheets

FIG. 5

| Byte \ Bit | 7 | 6 | 5 | 4 | 3 | 2 | 1 | 0 |
|---|---|---|---|---|---|---|---|---|
| 0 | (MSB) | | | | | | | |
| ... | | | T10 VENDOR IDENTIFICATION | | | | | |
| 7 | | | | | | | | (LSB) |
| 8 | VERSION | | | | | | | |
| 9 | Reserved | | | EHS_RETRIEVED =00b | | EHS_SOURCE =00b | | CLR_SUP =0b |
| 10 | (MSB) | | | | | | | |
| ... | | | | Reserved | | | | |
| 29 | | | | | | | | (LSB) |
| 30 | (MSB) | | | | | | | |
| | | | | DIRECTORY LENGTH (n-31) | | | | |
| 31 | | | | | | | | (LSB) |
| Error history directory list | | | | | | | | |
| 32 | (MSB) | | | | | | | |
| ... | | | | Error history directory entry [first] | | | | |
| 39 | | | | | | | | (LSB) |
| ... | | | | ... | | | | |
| n-7 | (MSB) | | | | | | | |
| ... | | | | Error history directory entry [last] | | | | |
| n | | | | | | | | (LSB) |

FIG. 6

| Byte \ Bit | 7 | 6 | 5 | 4 | 3 | 2 | 1 | 0 |
|---|---|---|---|---|---|---|---|---|
| 0 | OPERATION CODE (3Ch) ||||||||
| 1 | Reserved ||| MODE |||||
| 2 | BUFFER ID ||||||||
| 3 | (MSB) |||||||  |
| 4 | BUFFER OFFSET ||||||||
| 5 |  ||||||| (LSB) |
| 6 | (MSB) |||||||  |
| 7 | ALLOCATION LENGTH ||||||||
| 8 |  ||||||| (LSB) |
| 9 | CONTROL = 00h ||||||||

FIG. 7

| MODE | DESCRIPTION |
|---|---|
| 00h | Not used in UFS |
| 01h | Vendor specific |
| 02h | Data |
| 03h-1Bh | Not used in UFS |
| 1Ch | Error history read |
| 1Dh | Error history clear |
| 1Eh-1Fh | Reserved |

FIG. 8

| BUFFER ID | DESCRIPTION | BUFFER OFFSET |
|---|---|---|
| 00h | Return error history directory[1] | Zero[2] |
| 01h-03h | Not used in UFS | |
| 04h-0Fh | Reserved | |
| 10h-EFh | Error history directory entry corresponding to error history buffer ID | Zero[2] to Maximum[3] |
| F0h-FCh | Reserved | |
| FDh | All error history entries | |
| FEh-FFh | Not used in UFS | |
| NOTE 1 A error history snapshot is never created in this standard.<br>NOTE 2 Zero is 000000h for the READ BUFFER (10) command.<br>NOTE 3 Maximum is FFFFFFh for the READ BUFFER (10) command. | | |

FIG. 9A

| Byte \ Bit | 7 | 6 | 5 | 4 | 3 | 2 | 1 | 0 |
|---|---|---|---|---|---|---|---|---|
| 0 | colspan=8 OPERATION CODE (3Ch) |
| 1 | Reserved | | | | MODE (1Dh) | | | |
| 2 | BUFFER ID (10h) | | | | | | | |
| 3 | (MSB) | | | | | | | |
| 4 | BUFFER OFFSET (00h) | | | | | | | |
| 5 | | | | | | | | (LSB) |
| 6 | (MSB) | | | | | | | |
| 7 | ALLOCATION LENGTH (8000h) | | | | | | | |
| 8 | | | | | | | | (LSB) |
| 9 | CONTROL = 00h | | | | | | | |

FIG. 9B

| Bit<br>Byte | 7 | 6 | 5 | 4 | 3 | 2 | 1 | 0 |
|---|---|---|---|---|---|---|---|---|
| 0 | colspan="8" | OPERATION CODE (3Ch) |||||||
| 1 | Reserved ||| MODE (1Dh) |||||
| 2 | BUFFER ID (FDh) ||||||||
| 3 | (MSB) | | | | | | | |
| 4 | | | | BUFFER OFFSET (00h) | | | | |
| 5 | | | | | | | | (LSB) |
| 6 | (MSB) | | | | | | | |
| 7 | | | | ALLOCATION LENGTH (00h) | | | | |
| 8 | | | | | | | | (LSB) |
| 9 | CONTROL = 00h ||||||||

MEMORY SYSTEM AND DATA PROCESSING SYSTEM

CROSS-REFERENCE TO RELATED APPLICATION(S)

The present application claims priority under 35 U.S.C. § 119(a) to Korean Patent Application Nos. 10-2021-0051191, filed on Apr. 20, 2021, and 10-2021-0094761, filed on Jul. 20, 2021, the disclosure of which are incorporated herein by reference in their entirety.

BACKGROUND

1. Field

Various embodiments of the present disclosure relate to a memory system and a data processing system.

2. Description of the Related Art

Recently, a computer environment paradigm has shifted to ubiquitous computing, which enables a computer system to be accessed anytime and everywhere. As a result, the use of portable electronic devices such as mobile phones, digital cameras, notebook computers and the like has increased. Such portable electronic devices typically use or include a memory system that uses or embeds at least one memory device, i.e., a data storage device. The data storage device can be used as a main storage device or an auxiliary storage device of a portable electronic device.

In a computing device, unlike a hard disk, a data storage device implemented as a nonvolatile semiconductor memory device is advantageous in that it has excellent stability and durability because it has no mechanical driving part (e.g., a mechanical arm), and has high data access speed and low power consumption. Examples of such a data storage device include a universal serial bus (USB) memory device, a memory card having various interfaces, and a solid state drive (SSD).

SUMMARY

Various embodiments of the present disclosure are directed to a memory system that enables a host to easily analyze a failure thereof, and a data processing system including the memory system.

In accordance with an embodiment of the present invention, a data processing system may include: a memory system including an error history region, the memory system suitable for storing in the error history region, error history data related to an internal error; and a host suitable for obtaining the error history data from the memory system by providing the memory system with an error history read command, performing failure analysis of the memory system on the basis of the obtained error history data, and controlling the memory system to clear at least a portion of the error history region by providing the memory system with an error history clear command. The error history region may be a memory region that is not able to be accessed with a logical address used by the host.

In accordance with an embodiment of the present invention, a memory system may include: a memory device including an error history region; and a controller suitable for clearing at least a portion of the error history region in response to an error history clear command from a host. The error history region may be a memory region that is not able to be accessed with a logical address used by the host.

In accordance with an embodiment of the present invention, a memory system may include: a memory device including an error history region for storing error history data related to an error occurring inside the memory system; a controller suitable for obtaining the error history data from the error history region in response to an error history read command from a host; and an encryptor suitable for encrypting the error history data obtained by the controller and providing the host with the encrypted error history data.

In accordance with an embodiment of the present invention, an operating method of a controller, the operating method may include: receiving, from a host, an error history command indicating at least one of buffer regions within a memory device; and controlling, in response to the command, the memory device to access at least a selected one of error history directory entries to obtain error history data from the selected entry. The buffer regions may correspond respectively to the entries. The entries may be included in a system region within the memory device. The command may be a universal flash storage protocol information unit (UPIU) indicating at least error history data clearance.

BRIEF DESCRIPTION OF THE DRAWINGS

FIG. 5 is a diagram illustrating error history data that can be stored in the error history region in accordance with an embodiment of the present disclosure.

FIGS. 6 to 8, 9A and 9B are detailed diagrams illustrating an error history clear command in accordance with an embodiment of the present disclosure.

DETAILED DESCRIPTION

Figure 1:
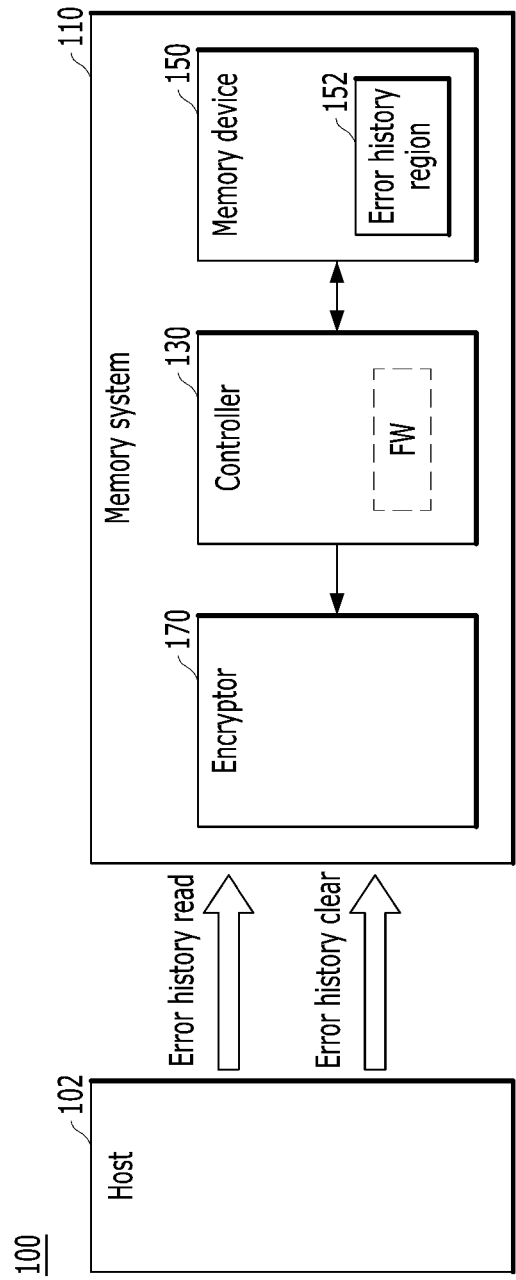
FIG. 1 is a diagram schematically illustrating an example of a data processing system including a memory system, in accordance with an embodiment of the present disclosure.

Various embodiments of the present disclosure are described below with reference to the accompanying drawings. Elements and features of the present disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware—for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in the disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

In an embodiment, a data processing system may include: a memory system including an error history region, and suitable for storing, in the error history region, error history data related to an internal error; and a host suitable for obtaining the error history data from the memory system by providing the memory system with an error history read command, performing failure analysis of the memory system on the basis of the obtained error history data, and controlling the memory system to clear at least a portion of the error history region by providing the memory system with an error history clear command. The error history region may be a memory region that is not able to be accessed with a logical address used by the host.

The error history clear command may be a read buffer command whose mode is designated as an error history clear mode, and the error history clear mode may be defined in the read buffer command, which is a small computer system interface (SCSI) command.

The error history region may include a plurality of error history directory entries, and the host may provide the memory system with the error history clear command including a buffer identifier (ID) value corresponding to any of the error history directory entries, and controls the memory system to clear one of the error history directory entries.

The error history region may include a plurality of error history directory entries, the host may provide the memory system with the error history clear command including a buffer ID value corresponding to all of the error history directory entries, and may control the memory system to clear all of the error history directory entries, and the buffer ID value may be included in the error history clear command.

The error history region may include a plurality of error history directory entries, and the memory system may load data of the error history region into an internal volatile memory in response to the error history clear command that designates at least one of the plurality of error history directory entries, may erase the error history region, may modify the loaded data by removing data which corresponds to the designated error history directory entry from the loaded data, and may program the modified data into the error history region.

The error history region may include a plurality of error history directory entries, and the memory system may load data of the error history region into an internal volatile memory in response to the error history clear command that designates at least one of the plurality of error history directory entries, may erase the error history region, may modify the loaded data by overwriting at least a partial data piece which corresponds to the designated error history directory entry among the loaded data, with clear-mark data, and may clear the designated error history directory entry by programming the modified data into the error history region.

The memory system may store new error history data in the cleared error history directory entry when a new error occurs therein while being re-driven after the error history clear command is processed.

The memory system may load data of the error history region into an internal volatile memory, may erase the error history region, modifies the loaded data by overwriting data which corresponds to the cleared error history directory entry among the loaded data, with the new error history data, and may store the new error history data in the cleared error history directory entry by storing the modified data in the error history region.

The host may further provide the memory system with an error history read command after the memory system is re-driven, and when obtaining valid error history data from the memory system, the host may analyze a cause of the newly-occurring error on the basis of the obtained error history data.

When the error history data obtained in response to the error history read command corresponds to the clear-mark data, the host may determine that the error history region has been cleared by the host and terminates the failure analysis.

The memory system may include a plurality of memory blocks, and the error history region may correspond to any of the plurality of memory blocks.

The memory system may be a universal flash storage (UFS) device.

In an embodiment, a memory system may include: a memory device having an error history region; and a controller suitable for clearing at least a portion of the error history region in response to an error history clear command of a host. The error history region may be a memory region that is not able to be accessed with a logical address used by the host.

The error history clear command may be a read buffer command whose mode is designated as an error history clear mode, and the error history clear mode may be defined in the read buffer command, which is a small computer system interface (SCSI) command.

The error history region may include a plurality of error history directory entries, and the error history clear command may be a specific error history clear command including a buffer identifier (ID) value corresponding to one of the error history directory entries.

In an embodiment, a memory system may include: a memory device including an error history region for storing error history data related to an error occurring inside the memory system; a controller suitable for obtaining the error history data stored in the error history region in response to an error history read command of a host; and an encryptor suitable for encrypting the error history data obtained from the controller, and providing the host with the encrypted error history data.

Data received from the host may bypass the encryptor.

The error history region may be a memory region that is not able to be accessed with a logical address used by the host.

FIG. 1 is a diagram schematically illustrating an example of a data processing system 100 including a memory system 110, in accordance with an embodiment of the present disclosure.

Referring to FIG. 1, the data processing system 100 includes a host 102 and the memory system 110.

The host 102 may be embodied by any of various electronic devices, for example, portable electronic devices such as a mobile phone, an MP3 player and a laptop computer or electronic devices such as a desktop computer, a game machine, a television (TV) and a projector, that is, wired and wireless electronic devices.

The host 102 may include at least one operating system (OS). The operating system generally manages and controls overall function and operation of the host 102, and provides interoperability between the host 102 and a user using the data processing system 100 or the memory system 110. The operating system may support functions and operations corresponding to the use, purpose, and usage of a user. For example, the operating system may be a general operating system or a mobile operating system, depending on the mobility of the host 102. The general operating system may be a personal operating system or an enterprise operating system, depending on the user's usage environment.

The memory system 110 may operate to store data of the host 102, in response to a request of the host 102.

The host 102 may communicate with the memory system 110 through a predetermined interface. For example, when the memory system 110 is a universal flash storage (UFS) device, the host 102 may communicate with the memory system 110 through a UFS interface based on a small computer system interface (SCSI) command set. However, the present disclosure is not limited thereto, and the present disclosure may be applied to various memory systems 110 capable of communicating with the host 102 by using the SCSI command set.

For example, the memory system 110 may be implemented as any of various types of storage devices, i.e., a solid state drive (SSD), a multimedia card (e.g., an MMC, an embedded MMC (eMMC), a reduced size MMC (RS-MMC) and a micro-MMC), a secure digital card (e.g., an SD, a mini-SD and a micro-SD), a universal serial bus (USB) storage device, a universal flash storage (UFS) device, a compact flash (CF) card, a smart media card, and a memory stick.

The memory system 110 may be implemented as various types of storage devices. For example, the storage devices which implement the memory system 110 may include a volatile memory device such as a dynamic random access memory (DRAM) and/or a static random access memory (SRAM), and a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM), a resistive RAM (RRAM) and/or a flash memory. The flash memory may have a three-dimensional stack structure.

The memory system 110 may include a memory device 150, a controller 130 and an encryptor 170. The memory device 150 may store data for the host 102, and the controller 130 may control storage of data into the memory device 150. The encryptor 170 may encrypt data outputted from the controller 130 to the host 102.

The controller 130, the memory device 150 and the encryptor 170 may be integrated into a single semiconductor device. For example, the controller 130, the memory device 150 and the encryptor 170 may be integrated as one semiconductor device to constitute a solid state drive (SSD). When the memory system 110 is used as an SSD, the operating speed of the host 102 connected to the memory system 110 may be improved. In another embodiment, the controller 130, the memory device 150 and the encryptor 170 may be integrated as one semiconductor device to constitute a memory card such as, a personal computer memory card international association (PCMCIA) card, a compact flash (CF) card, a smart media card (e.g., an SM and an SMC), a memory stick, a multimedia card (e.g., an MMC, an RS-MMC and a micro-MMC), a secure digital card (e.g., an SD, a mini-SD, a micro-SD and an SDHC), and/or a universal flash storage (UFS) device.

In another embodiment, the memory system 110 may be disposed in a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various circuitry elements configuring a computing system.

The memory device 150 may be a nonvolatile memory device, and may retain data stored therein even though power is not supplied. The memory device 150 may store data provided from the host 102 through a program operation, and provide data stored therein to the host 102 through a read operation. In an embodiment, the memory device 150 may be a flash memory.

The controller 130 may control the memory device 150 in response to a request of the host 102. For example, the controller 130 may provide data read from the memory device 150 to the host 102, and store data provided from the host 102 into the memory device 150. To this end, the controller 130 may control read, program and erase operations of the memory device 150. The controller 130 may drive firmware FW to control the memory device 150.

An error may occur during the operation of the memory system 110. When an error occurs in the memory system 110, the controller 130 may store, in the memory device 150, error history data representing information on the error. The memory device 150 may include an error history region 152, which is a dedicated region for storing the error history data. The error history region 152 may be implemented as a nonvolatile memory.

The memory system 110 in which the error has occurred may be subjected to failure analysis by a vendor of the memory system 110 later on. The vendor may obtain the error history data stored in the error history region 152, and utilize the error history data for the failure analysis of the memory system 110. For example, the vendor may analyze the error history data of the memory system 110, and find a firmware code causing the error by repeatedly reproducing the error occurrence.

The error history region 152 may be included in the memory device 150, and be a memory region that cannot be accessed by a logical address used in a file system of the host 102. The host 102 may not be able to access the error history region 152 by using general read and write commands, for example, READ(10) and WRITE(10) commands supported by a UFS device.

The memory system 110 may support a command that allows the host 102 to obtain the error history data from the error history region 152. For example, when the memory system 110 is a UFS 3.0 device, the host 102 may provide the controller 130 with an error history read command to obtain the error history data from the memory system 110. The controller 130 may provide the host 102 with the error history data stored in the error history region 152, in response to the error history read command of the host 102. The vendor may obtain the error history data provided to the host 102, and use the error history data for the failure analysis of the memory system 110.

The error history data outputted from the controller 130 may be encrypted through the encryptor 170, and then provided to the host 102. The error history data may include system information of the memory system 110. For example, the system information may include information on hardware and firmware constituting the memory system 110. It is preferable that the system information is not leaked to the outside of the vendor of the memory system 110.

When error history data is outputted from the host 102, the vendor of the memory system 110 may obtain the data, but a vendor of the data processing system 100, a customer company including an A/S center or a general user may also obtain the data. In order to protect the system information from the customer company or the general user, the encryptor 170 may encrypt the error history data outputted from the controller 130, and provide the host 102 with the encrypted data.

Even though the customer company obtains the encrypted error history data, the customer company may not decrypt the data. Accordingly, the system information of the memory system 110 may be protected even though the error history data is leaked to the outside. On the other hand, the vendor of the memory system 110 may decrypt the encrypted error history data. The vendor of the memory system 110 may directly obtain the error history data from the memory system 110, and perform the failure analysis of the memory system 110. In addition, the vendor of the memory system 110 may remotely receive the error history data obtained by the customer company, and perform the failure analysis of the memory system 110 without directly obtaining the error history data from the memory system 110.

The encryptor 170 may selectively encrypt data outputted from the controller 130. For example, the controller 130 may control the encryptor 170 not to encrypt at least a portion of the error history data, thereby disclosing the at least a portion of the error history data to the outside of the vendor of the memory system 110.

When data remains in the error history region 152 even after the host 102 obtains the error history data, it may be difficult for the host 102 to perform the failure analysis of the memory system 110 due to the remaining data. For example, the memory system 110 may be re-driven for the failure analysis or may be re-driven after the failure analysis is completely performed. When a new error occurs while the memory system 110 is being re-driven, the controller 130 may generate new error history data.

When there is no space to store a new error history data because an existing error history data is not removed from the error history region 152, the controller 130 may not store the new error history data in the error history region 152 but discard the new error history data, or remove the existing error history data stored in the error history region 152 and store the new error history data. When the new error history data is not stored in the error history region 152, it may be difficult for the host 102 to analyze a cause of a new error. When the new error history data is stored in the region of the error history region 152 where the existing error history data is stored, it may be difficult for the host 102 to distinguish whether the error history data obtained from the error history region 152 is data due to an error that has previously occurred or data due to an error that has newly occurred.

According to an embodiment, the memory system 110 may support an error history clear command for the host 102 to clear the error history region 152. The host 102 may control the memory system 110 to delete the error history data by using the error history clear command. When the memory system 110 is re-driven after the error history region 152 is cleared, the controller 130 may store new error history data in the error history region 152 even though a new error occurs in the memory system 110. In addition, the host 102 may easily analyze a cause of the new error by obtaining the new error history data from the memory system 110. The memory system 110 according to the present embodiment is described in detail with reference to FIGS. 2 to 11B.

Figure 2:
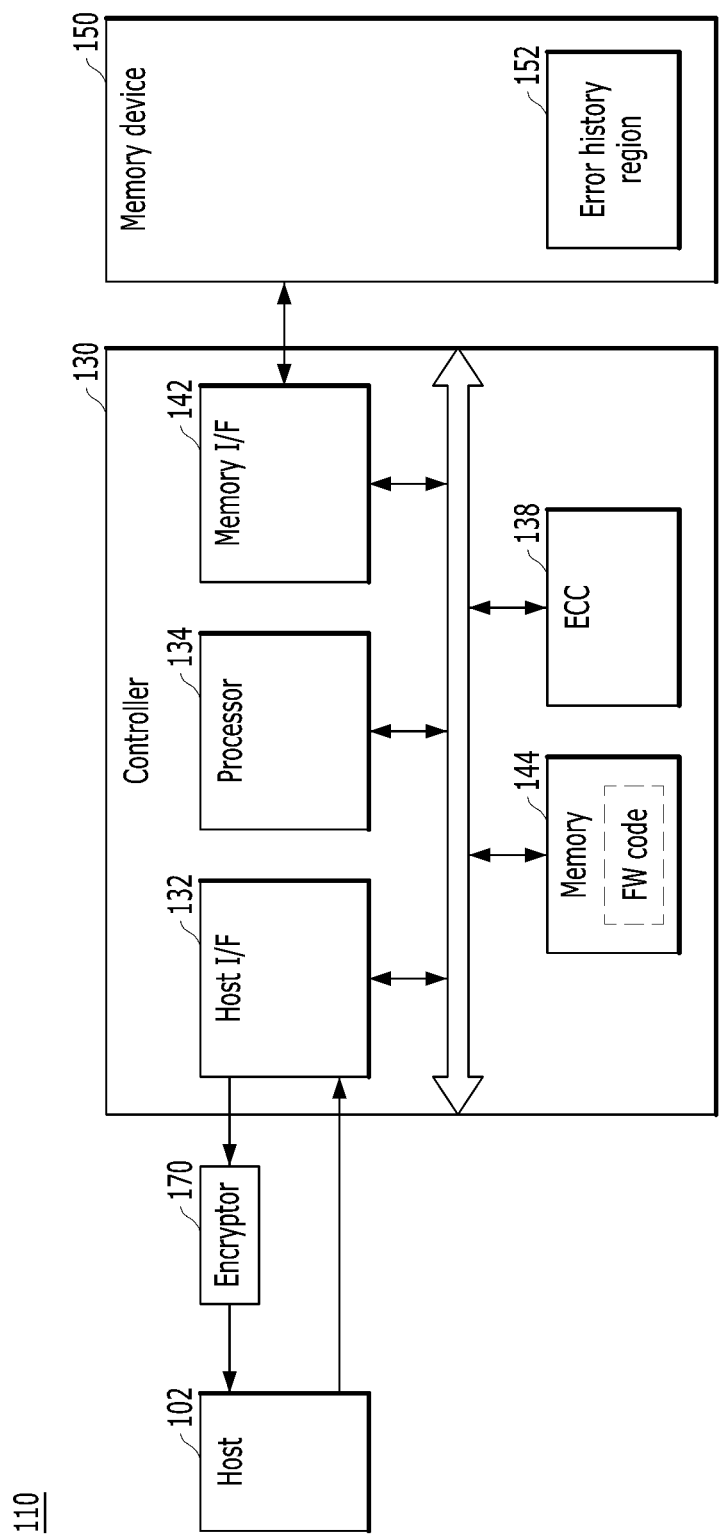
FIG. 2 is a diagram illustrating a memory system in accordance with an embodiment of the present disclosure.

FIG. 2 is a diagram illustrating a memory system 110 in accordance with an embodiment of the present disclosure.

A controller 130, a memory device 150 and an encryptor 170 illustrated in FIG. 2 may correspond to the controller 130, the memory device 150 and the encryptor 170 described with reference to FIG. 1, respectively.

The controller 130 may include a host interface 132, a processor 134, an error correction code (ECC) encoder/decoder 138, a memory interface 142 and a memory 144, all operatively coupled via an internal bus.

The host interface 132 may be configured to process a command and data of the host 102 and to communicate with the host 102 by using an SCSI command set. For example, when the memory system 110 is a UFS device, the host interface 132 may communicate with the host 102 through a UFS interface.

The host interface 132 may drive firmware referred to as a host interface layer (HIL) in order to exchange data with the host 102.

The ECC 138 may detect and correct an error contained in data read from the memory device 150. In other words, the ECC 138 may perform an error correction decoding process on the data read from the memory device 150 through an ECC value used during an ECC encoding process. According to a result of the error correction decoding process, the ECC 138 may output a signal, for example, an error correction success/fail signal. When the number of error bits is more than a threshold value of correctable error bits, the ECC 138 may not correct the error bits, and may output an error correction fail signal.

The ECC 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and/or Block coded modulation (BCM). However, the ECC 138 is not limited to any specific structure. Examples of the ECC 138 may include any and all circuits, modules, systems or devices for error correction.

The memory interface 142 may serve as a memory/storage interface for interfacing the controller 130 and the memory device 150 such that the controller 130 controls the memory device 150 in response to a request of the host 102. When the memory device 150 is a flash memory or specifically a NAND flash memory, the memory interface 142 may generate a control signal for the memory device 150, and process data provided to the memory device 150 under the control of the processor 134. The memory interface 142 may operate as an interface (e.g., a NAND flash interface) for processing a command and data between the controller 130 and the memory device 150.

The memory interface 142 may drive firmware referred to as a flash interface layer (FIL).

The processor 134 may control overall operation of the memory system 110. The processor 134 may drive firmware to control overall operation of the memory system 110. The firmware may be referred to as a flash translation layer (FTL). Also, the processor 134 may be realized as a microprocessor or a central processing unit (CPU).

The processor 134 may drive the FTL and perform a foreground operation corresponding to a request received from the host 102. For example, the processor 134 may control a write operation of the memory device 150 in response to a write command from the host 102, and control a read operation of the memory device 150 in response to a read command from the host 102. The processor 134 may provide a program command, a read command or an erase command to control the memory device 150. Hereinafter, the program command, the read command and the erase command provided by the processor 134 to the memory device 150 are referred to as an internal program command, an internal read command and an internal erase command in order to be distinguished from the commands provided by the host 102 to the memory system 110.

Also, the controller 130 may perform a background operation on the memory device 150 through the processor 134, which is realized as a microprocessor or a central processing unit (CPU). Examples of the background operation performed on the memory device 150 may include a garbage collection (GC) operation, a wear-leveling (WL) operation, a map flush operation and a bad block management operation.

The memory 144 may serve as an operating memory of the memory system 110 and the controller 130, and store data for driving the memory system 110 and the controller 130. The controller 130 may control the memory device 150 to perform read, program and erase operations in response to a request of the host 102. The controller 130 may provide the host 102 with data read from the memory device 150, and store data provided from the host 102 into the memory device 150. The memory 144 may store data required for the controller 130 and the memory device 150 to perform these operations.

The memory 144 may store a firmware code for driving the firmware FW such as the HIL, FIL and FTL.

The memory 144 may be implemented as a volatile memory. For example, the memory 144 may be implemented as a static random access memory (SRAM) or a dynamic random access memory (DRAM). The memory 144 may be disposed within or out of the controller 130. FIG. 1 illustrates the memory 144 disposed within the controller 130. In another embodiment, the memory 144 may be implemented as an external volatile memory, and have a memory interface transferring data between the memory 144 and the controller 130.

The encryptor 170 may operate unidirectionally. As described with reference to FIG. 1, the encryptor 170 may encrypt error history data outputted from the host interface 132, and transmit the encrypted error history data to the host 102. On the other hand, data provided from the host 102 to the host interface 132 may bypass the encryptor 170.

As described with reference to FIG. 1, the memory device 150 may include an error history region 152. The error history region 152 may correspond to a portion of the nonvolatile memory constituting the memory device 150.

According to the present embodiment, the memory device 150 is described as a nonvolatile memory such as a flash memory, for example, a NAND flash memory. However, the memory device 150 may be implemented as one of memories such as a phase-change random access memory (PCRAM), a resistive random access memory (RRAM or ReRAM), a ferroelectric random access memory (FRAM) and a spin transfer torque magnetic random access memory (SU-RAM or STT-MRAM).

A flash memory device may store data in a memory cell array composed of memory cell transistors. The flash memory device may have a hierarchical structure of a memory die, a plane, a memory block and a page. One memory die may receive one command at a time. The flash memory device may include a plurality of memory dies. One memory die may include a plurality of planes, and the plurality of planes may process in parallel the command received by the memory die. Each of the planes may include a plurality of memory blocks. Each of the memory blocks may be a minimum unit of an erase operation. One memory block may include a plurality of pages. Each of the pages may be a minimum unit of a write operation.

Hereinafter, the configuration of the memory device 150 is described in detail with reference to FIG. 3, and the error history region 152 is described in detail with reference to FIG. 4.

Figure 3:
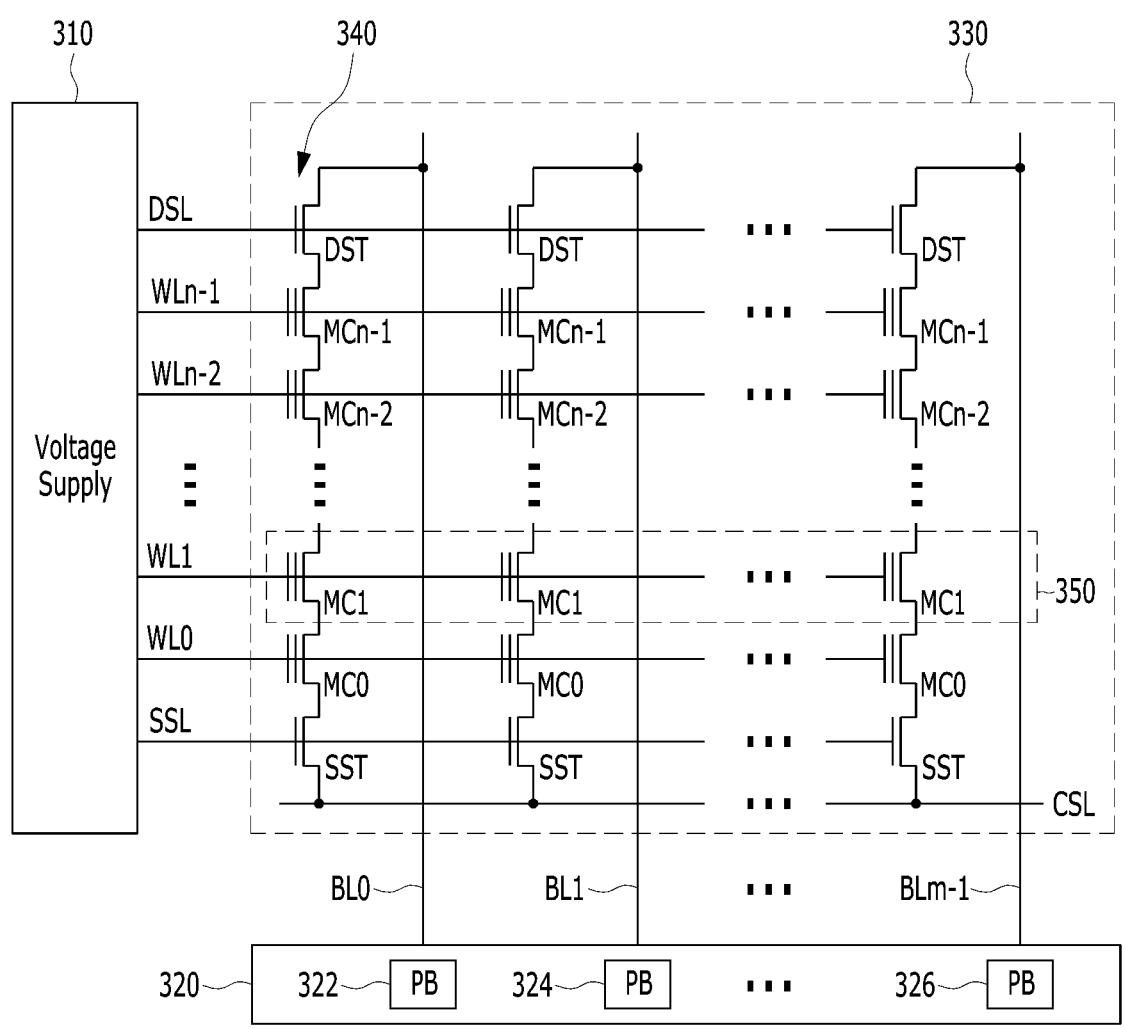
FIG. 3 is a circuit diagram illustrating a configuration of a memory cell array included in a memory device in accordance with an embodiment of the present disclosure.

FIG. 3 is a circuit diagram illustrating a configuration of a memory cell array included in the memory device 150 in accordance with an embodiment of the present disclosure.

Referring to FIG. 3, a memory block 330 that may correspond to any of a plurality of memory blocks included in the memory device 150 of the memory system 110 may include a plurality of cell strings 340 connected to a plurality of bit lines BL0 to BLm-1, respectively. The cell string 340 of each column may include at least one drain selection transistor DST and at least one source selection transistor SST. A plurality of memory cells MC0 to MCn-1 may be connected in series between the drain selection transistor DST and the source selection transistor SST. Each of the memory cells MC0 to MCn-1 may be implemented as an MLC that stores data information of a plurality of bits per cell. The respective cell strings 340 may be electrically connected to the bit lines BL0 to BLm-1. For example, as illustrated in FIG. 3, a first cell string may be connected to the first bit line BL0, and a last cell string may be connected to the last bit line BLm-1. In FIG. 3, "DSL" denotes a drain selection line, "SSL" denotes a source selection line, and "CSL" denotes a common source line.

Although FIG. 3 illustrates NAND flash memory cells, the present disclosure is not limited thereto. The memory cells may be NOR flash memory cells. Also, the memory device 150 may be a flash memory device including a conductive floating gate as a charge storage layer or a charge trap flash (CTF) memory device in which a charge storage layer is formed of an insulating layer.

The memory device 150 may further include a voltage supply unit 310 that provides word line voltages including a program voltage, a read voltage and a pass voltage to be supplied to word lines, according to an operation mode. A voltage generation operation of the voltage supply unit 310 may be controlled by a control circuit (not illustrated). Under the control of the control circuit, the voltage supply unit 310 may select one of memory blocks (or sectors) of the memory cell array, select one of word lines of the selected memory block, provide the selected word line with the word line voltage, and provide an unselected word line with the word line voltage, if necessary.

The memory device 150 may include a read/write circuit 320 controlled by the control circuit. During a verification/normal read operation, the read/write circuit 320 may operate as a sense amplifier to read data from the memory cell array. During a program operation, the read/write circuit 320 may operate as a write driver that drives bit lines according to data to be stored in the memory cell array. During the program operation, the read/write circuit 320 may receive the data to be stored in the memory cell array from a buffer (not illustrated), and drive the bit lines according to the received data. The read/write circuit 320 may include a plurality of page buffers 322, 324 and 326 respectively corresponding to columns (or bit lines) or column pairs (or bit line pairs). Each of the page buffers 322, 324 and 326 may include a plurality of latches (not illustrated).

The memory device 150 may include a plurality of memory blocks including a single level cell (SLC) memory block for storing 1-bit data and a multi-level cell (MLC) memory block for storing multi-bit data. The SLC memory block may include a plurality of pages implemented as memory cells each storing one bit data therein. The SLC memory block may have high durability and fast data operation performance. On the other hand, the MLC memory block may include a plurality of pages implemented as memory cells each storing multi-bit data, such as two or more bits, therein. The MLC memory block may have a larger data storage space than the SLC memory block. That is, the MLC memory block may be highly integrated.

The memory cells MC0 to MCn-1 of the memory block 330 may be connected to a plurality of word lines WL0 to WLn-1. Memory cells connected to one word line may be referred to as a page. FIG. 2 illustrates a page 350 including memory cells MC1 connected to a word line WL1. The memory cells MC0 to MCn-1 may be accessed in units of pages by the voltage supply unit 310 and the read/write circuit 320.

Figure 4:
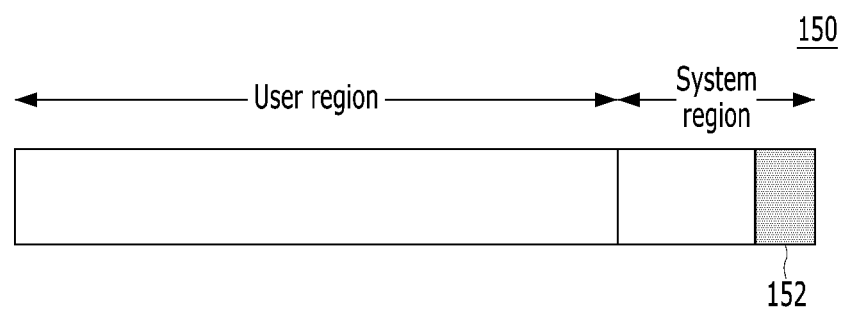
FIG. 4 is a detailed diagram illustrating an error history region in accordance with an embodiment of the present disclosure.

FIG. 4 is a detailed diagram illustrating the error history region 152 in accordance with an embodiment of the present disclosure.

FIG. 4 schematically illustrates a memory region of the memory device 150. The memory region may be identified by a physical address. For example, different physical addresses may be allocated to respective pages of the memory device 150. The memory region may include a user region and a system region.

The user region, which is a region that can store user data, refers to a region that can be accessed using a logical address. For example, the logical address may be a logical block address (LBA) used in a file system based on an operating system of the host 102. A read command or a write command provided by the host 102 to the controller 130 may include the logical address. On the basis of logical addresses, the controller 130 may store, in the memory 144, map data representing physical addresses corresponding to the logical addresses. The controller 130 may translate the logical addresses received from the host 102 into physical addresses with reference to the map data.

The system region refers to a region that can store system data. The system data, which is data for management of the memory system 110, may include a firmware code, map data and error history data. The system region may not be accessed using a logical address.

The system region may include the error history region 152. The error history region 152 may be designated by physical addresses within a predetermined range. For example, a predetermined memory block of the memory blocks included in the memory device 150 may be allocated as the error history region 152. The memory block allocated as the error history region 152 may be an SLC memory block having higher reliability and faster access speed than an MLC memory block.

An example of a method proposed for the host 102 to remove error history data of the memory system 110 is that the host 102 provides the memory system 110 with a field firmware update (FFU) command, deletes all system data of the system region, and reinstalls firmware (FW). When all of the system data is deleted, not only the error history data but also data causing an error may be removed. When the error causing data is removed, it may be difficult for the host 102 to reproduce the error occurrence of the memory system 110. Accordingly, when the host 102 removes the error history data by using the FFU command, the failure analysis of the memory system 110 may fail.

According to an embodiment, the host 102 may remove only the error history data from among the system data by using an error history clear command. Even though the error history data of the memory system 110 is removed, the error causing data may be maintained, and thus the vendor may easily reproduce the error occurrence of the memory system 110. In addition, the memory system 110 may store error history data for the reproduced error in the error history region 152. Accordingly, the vendor may easily perform the failure analysis of the memory system 110.

Hereinafter, the error history data is described with reference to FIG. 5, and an example of the error history clear command according to an embodiment is described in detail with reference to FIGS. 6 to 8, 9A and 9B.

FIG. 5 is a diagram illustrating the error history data that can be stored in the error history region 152 in accordance with an embodiment of the present disclosure.

When the memory system 110 is a UFS device, the error history data may be stored in an error history directory. However, the error history data of the present disclosure is not limited to the example illustrated in FIG. 5.

As illustrated in FIG. 5, each row corresponds to a byte of the error history data, and each column corresponds to a bit of each byte.

The error history directory may include a 32-byte header and a plurality of error history directory entries.

The header may include a plurality of fields. A vendor identification T10 VENDOR IDENTIFICATION field of zeroth to seventh bytes may include vendor information of the memory system 110. A version VERSION field of an eighth byte may indicate a version and format of the error history data. An error history source EHS_SOURCE field, a retrieved error history EHS_RETRIEVED field and a clear support CLR_SUP field of a ninth byte may be fixed to "0" in the UFS device and be fields that are not used effectively. 10th to $29^{th}$ bytes may be a reserved field. A directory length DIRECTORY LENGTH field of $30^{th}$ and $31^{st}$ bytes may indicate the number of the error history directory entries that can be stored in the error history region 152.

The plurality of error history directory entries may each store error history data. A format of data stored in each of the error history directory entries may be determined in advance by the vendor of the memory system 110, and may vary depending on the memory system 110. The number of error history directory entries may be determined in advance, and each of the error history directory entries may be identified by a predetermined physical address.

According to an embodiment, the host 102 may control the memory system 110 to delete all or part of the error history data by providing the memory system 110 with the error history clear command.

The error history clear command is described in detail with reference to FIGS. 6 to 8, 9A and 9B.

The UFS device may support a UFS protocol information unit (UPIU) referred to as a read buffer command READ BUFFER. The error history clear command may be defined on the basis of the read buffer command READ BUFFER.

FIG. 6 is a diagram illustrating the read buffer command READ BUFFER in accordance with an embodiment of the present disclosure.

FIG. 6 is a table illustrating a command descriptor block (CDB) of the read buffer command READ BUFFER. Each row of the table illustrated in FIG. 6 corresponds to a byte of the CDB, and each column corresponds to a bit of each byte.

An operation code OPERATION CODE of a zeroth byte may indicate a command corresponding to the CDB. Referring to FIG. 6, the read buffer command READ BUFFER may have an operation code "3Ch".

A mode of a first byte may designate an operation performed on an internal buffer by the memory system 110, in response to the read buffer command READ BUFFER.

A buffer ID BUFFER ID of a second byte may designate a buffer region on which the operation is to be performed.

A buffer offset BUFFER OFFSET of third to fifth bytes may designate a byte offset of data to be outputted from the designated buffer region, and an allocation length ALLOCATION LENGTH of sixth and eighth bytes may designate a length of the data to be outputted. A control CONTROL field of a ninth byte may be fixed to "ooh" in the UFS device.

An example of a mode MODE representing the error history clear command is described with reference to FIG. 7.

FIG. 7 is a table illustrating an operation performed by the memory system 110 according to a mode value of the read buffer command READ BUFFER in accordance with an embodiment of the present disclosure.

In an example of FIG. 7, a mode value "02h" indicates a data mode. Data transmitted to the host 102 in the data mode may vary depending on the memory system 110.

A mode value "1Ch" indicates an error history read mode. The error history read mode may be referred to as an error history mode in a UFS specification. Hereinafter, the error history read command may refer to the read buffer command READ BUFFER designated as the error history read mode.

In the UFS specification, mode values "1Dh", "1Eh" and "1Fh" may be reserved values.

According to an embodiment, the mode value "1Dh" may be defined as an error history clear mode. The error history clear mode may be a mode that supports that the host 102 can clear the error history region 152. The host 102 may control the memory system 110 to delete all or part of the error history data by providing the read buffer command READ BUFFER designated as the error history clear mode. Hereinafter, the read buffer command READ BUFFER designated as the error history clear mode may be referred to as the error history clear command.

When the host 102 provides the memory system 110 with the error history clear command, the host 102 may specify data to be removed among the error history data. An example of a method of specifying, by the host 102, the data to be removed is described with reference to FIG. 8.

FIG. 8 is a table illustrating examples of the buffer ID BUFFER ID of the read buffer command READ BUFFER in accordance with an embodiment of the present disclosure.

Each of the error history directory entries stored in the error history region 152 may correspond to a predetermined buffer ID BUFFER ID. For example, each of the error history directory entries may correspond to any of buffer ID values of "10h" to "EFh". Depending on implementation, only some of the buffer ID values of "10h" to "EFh" may be used effectively when the error history directory entry contains only a few error history directory entries.

According to an embodiment, the host 102 may provide the memory system 110 with a specific error history clear command, which is an error history clear command having a valid buffer ID BUFFER ID. The host 102 may instruct the memory system 110 to clear only the error history directory entry corresponding to the buffer ID BUFFER ID, by providing the specific error history clear command. The memory system 110 may clear the error history directory entry by removing data included in the error history directory entry corresponding to the buffer ID BUFFER ID included in the error history clear command.

According to an embodiment, a buffer ID BUFFER ID corresponding to all of the error history directory entries may be defined. In an example of FIG. 8, the buffer ID BUFFER ID corresponding to all of the error history directory entries may be defined as "FDh", which is a reserved buffer ID value in the UFS specification.

The host 102 may provide the memory system 110 with an error history read command having the buffer ID "FDh", in order to obtain all the error history data stored in the error history region 152.

In addition, the host 102 may provide the memory system 110 with a whole error history clear command, which is the error history clear command having the buffer ID "FDh", in order to clear all of the error history directory entries. The host 102 may instruct the memory system 110 to clear all of the error history directory entries by providing the whole error history clear command. The memory system 110 may clear all of the error history directory entries by removing all the error history data stored in the error history region 152.

FIG. 9A illustrates a CDB of a specific error history clear command in accordance with an embodiment of the present disclosure.

The CDB of FIG. 9A may correspond to the CDB of the read buffer command READ BUFFER described with reference to FIG. 6. Referring to FIG. 9A, the host 102 may provide the memory system 110 with the CDB including an operation code OPERATION CODE "3Ch", a mode MODE "1Dh", a buffer ID BUFFER ID "10h", a buffer offset BUFFER OFFSET "ooh" and an allocation length ALLOCATION LENGTH "8000h", to clear an error history unit from an error history directory entry corresponding to the buffer ID BUFFER ID "10h". Values of the buffer offset BUFFER OFFSET and allocation length ALLOCATION LENGTH illustrated in FIG. 9A are merely examples, and the present disclosure is not limited thereto. For example, the host 102 may designate a predetermined maximum length for the error history directory entry as the allocation length ALLOCATION LENGTH.

FIG. 9B illustrates a CDB of a whole error history clear command in accordance with an embodiment of the present disclosure.

The CDB of FIG. 9B may correspond to the CDB of the read buffer command READ BUFFER described with reference to FIG. 6. Referring to FIG. 9B, the host 102 may provide the memory system 110 with the CDB including an operation code OPERATION CODE "3Ch", a mode MODE "1Dh" and a buffer ID BUFFER ID "FDh", to clear all of the error history data. In the whole error history clear command, values of the buffer offset BUFFER OFFSET and allocation length ALLOCATION LENGTH may be fixed to "00h", but the present disclosure is not limited thereto.

Hereinafter, an operation performed by the memory system 110 in response to the error history clear command from the host 102 is described with reference to FIGS. 10, 11A and 11B.

Figure 10:
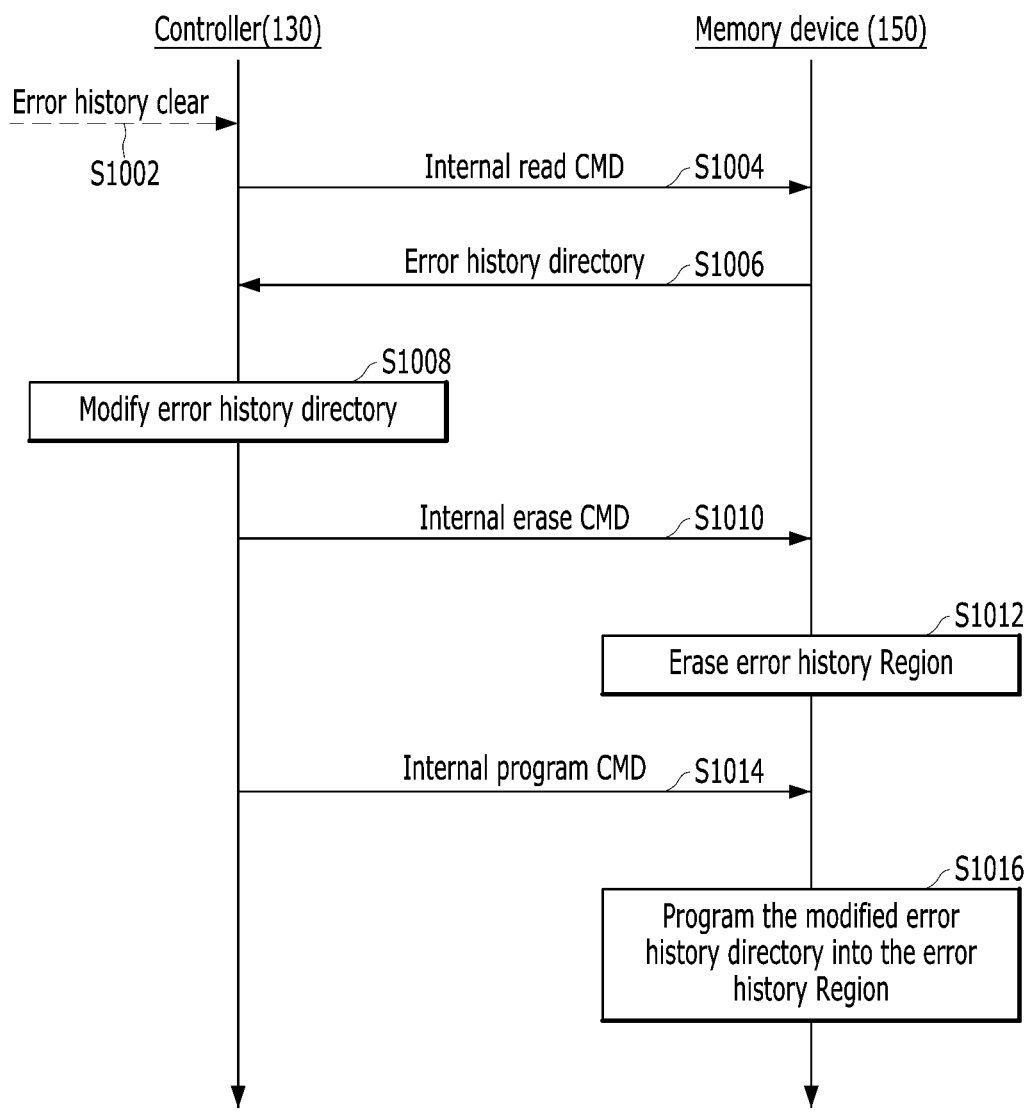
FIGS. 10, 11A and 11B are diagrams illustrating an operation of the memory system in accordance with an embodiment of the present disclosure.

FIG. 10 is a diagram illustrating an operation of the memory system 110 according to the error history clear command in accordance with an embodiment of the present disclosure.

In operation S1002, the controller 130 may receive the error history clear command from the host 102 through the host interface 132. A format of the error history clear command has been described in detail with reference to FIGS. 6 to 9B.

The controller 130 may clear all or some of the error history directory entries included in the error history region 152 by performing operations S1004 to S1016 in response to the error history clear command.

In operation S1004, the processor 134 of the controller 130 may provide an internal read command for the error history region 152. The internal read command may include a physical address indicating the error history region 152.

In operation S1006, the memory device 150 may provide the memory 144 of the controller 130 with error history data stored in an error history directory within the error history region 152, in response to the internal read command.

In operation S1008, the controller 130 may modify the error history data of the error history directory, the error history data being stored in the memory 144.

As a first example, when the error history read command is a specific error history read command, the processor 134 may remove, among the error history data stored in the memory 144, the error history data of an error history directory entry corresponding to the buffer ID BUFFER ID included in the command.

As a second example, when the error history read command is a whole error history read command, the processor 134 may remove all of the error history data stored in the memory 144, i.e., the error history data of all of the error history directory entries within the error history directory.

Depending on implementation, the processor 134 may overwrite predetermined data to an error history directory entry from which data has been removed. For example, the processor 134 may store "1" in all bits of the error history directory entry or "1" in predetermined bits. The predetermined data may indicate that the error history directory entry has been cleared at the request of the host 102. Hereinafter, the determined data is referred to as clear-mark data.

In operation S1010, the controller 130 may provide the memory device 150 with an internal erase command for the error history region 152.

In operation S1012, the memory device 150 may erase a memory block corresponding to the error history region 152, in response to the internal erase command.

In operation S1014, the controller 130 may provide the memory device 150 with an internal program command for the error history region 152 in order to program the modified error history directory, which is now stored in the memory 144, into the error history region 152.

In operation S1016, the memory device 150 may program the modified error history directory into the error history region 152 in response to the internal program command.

Since the data of the error history directory entry corresponding to the buffer ID BUFFER ID designated by the host 102 is removed from the data programmed into the error history region 152, the error history directory entry corresponding to the buffer ID BUFFER ID may be cleared.

An example of the data stored in the error history region 152 after the error history clear command is processed is described with reference to FIGS. 11A and 11B.

Figure 11A:
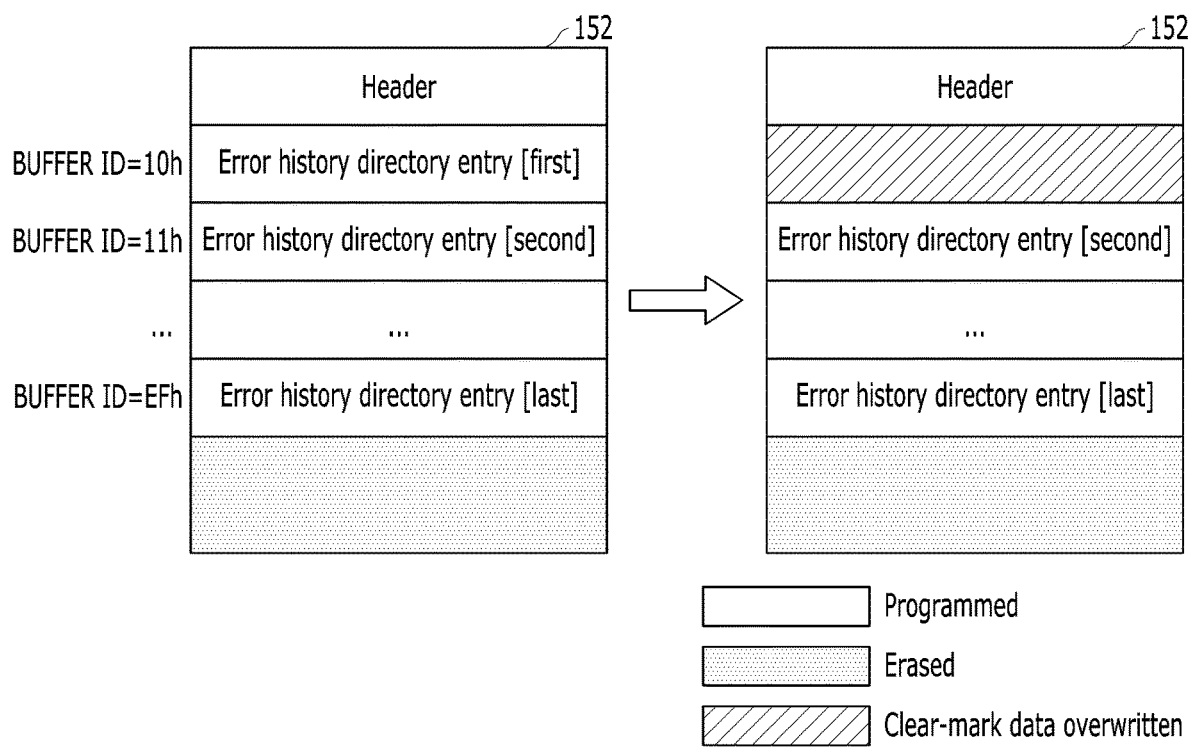
Figure 11B:
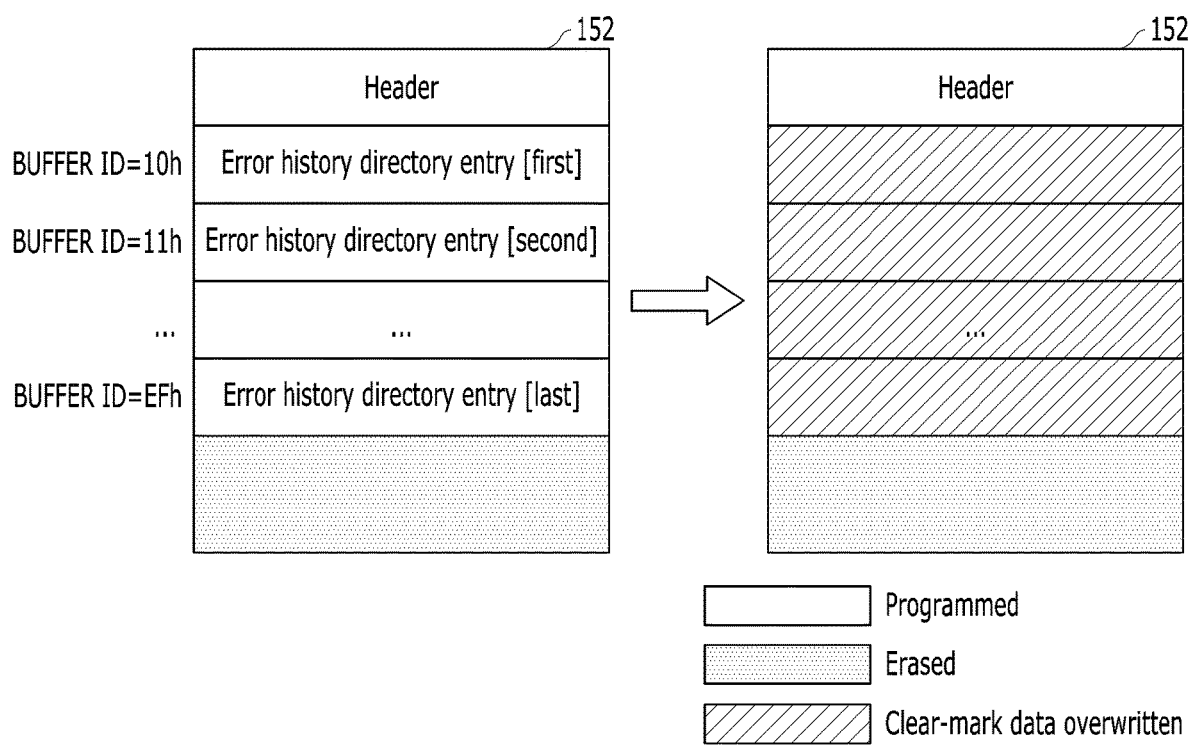

FIGS. 11A and 11B are diagrams illustrating the error history region 152 before and after the error history clear command is processed in accordance with an embodiment of the present disclosure. In the error history region 152 of FIGS. 11A and 11B, a region in which characters are displayed indicates a region in which corresponding data is programmed, a region in which a dot pattern is displayed indicates an erased region, and a region in which hatched lines are displayed indicates a region where clear-mark data has been overwritten.

FIG. 11A is a diagram illustrating data stored in the error history region 152 after a specific error history clear command is processed.

The error history region 152 illustrated on the left side of FIG. 11A illustrates data stored in the error history region 152 before the error history clear command is processed.

As described with reference to FIG. 5, the error history region 152 may include a header of the error history directory and a plurality of error history directory entries. Each of the plurality of error history directory entries may correspond to a buffer ID BUFFER ID, and the plurality of error history directory entries may store error history data.

The error history region 152 illustrated on the right side of FIG. 11A shows data stored in the error history region 152 after the specific error history clear command illustrated in FIG. 9A is processed. The error history clear command of FIG. 9A may have a buffer ID BUFFER ID "10h". Referring to FIG. 11A, as data included in the error history directory entry corresponding to the buffer ID BUFFER ID "10h" is removed, the error history directory entry may be cleared, and clear-mark data may be overwritten into the cleared error history directory entry. Data contained in the header and the other error history directory entries may be maintained.

When the host 102 reads the error history directory entry corresponding to the buffer ID BUFFER ID "10h" by using the error history read command after the specific error history clear command is processed, the host 102 may obtain the clear-mark data. By referring to the clear-mark data, the vendor may confirm that the error history directory entry has been emptied by the host 102.

FIG. 11B is a diagram illustrating data stored in the error history region 152 after the whole error history command is processed.

The error history region 152 illustrated on the left side of FIG. 11B may be the same as the error history region 152 illustrated on the left side of FIG. 11A.

The error history region 152 illustrated on the right side of FIG. 11B shows the data stored in the error history region 152 after the whole error history clear command illustrated in FIG. 9B is processed. Referring to FIG. 11B, all the error history directory entries may be cleared, and clear-mark data may be overwritten into all the entries. Data of the header may be maintained.

The host 102 may clear all the error history directory entries by using one whole error history clear command. When the host 102 obtains clear-mark data from the error history directory entries by using the error history read command after the whole error history clear command is processed, it may be confirmed that all of the error history directory entries have been emptied by the host 102.

According to an embodiment, the host 102 may obtain error history data from the memory system 110 by using an error history read command, and then clear an error history directory entry of the memory system 110 by using an error history clear command. Even though the memory system 110 clears the error history directory entry in response to the error history read command, the other system data except for the error history data may be maintained in the system region.

Since the other system data including error causing data is maintained in the system region, the host 102 may easily reproduce the occurrence of an error in the memory system 110. Also, since the error history directory entry is cleared, the memory system 110 may store, in the error history directory entry, new error history data corresponding to the reproduced error. Accordingly, the host 102 may easily perform failure analysis of the memory system 110 by using the error history clear command.

An example of a method of performing the failure analysis of the memory system 110 by the host 102 is described with reference to FIG. 12.

Figure 12:
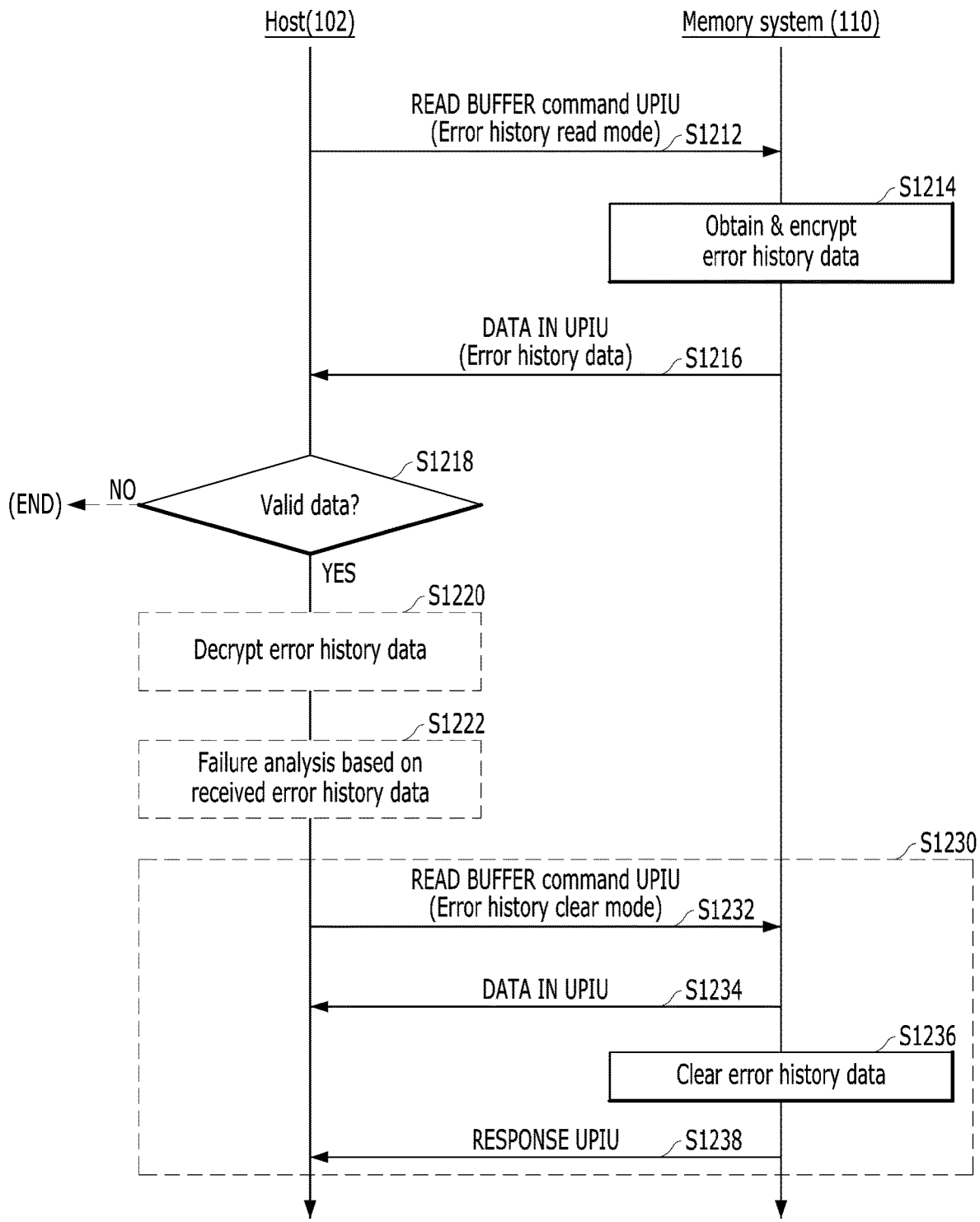
FIG. 12 is a diagram illustrating a transaction between a host and the memory system in accordance with an embodiment of the present disclosure.

FIG. 12 is a diagram illustrating a transaction between the host 102 and the memory system 110 in accordance with an embodiment of the present disclosure.

In operation S1212, the host 102 may provide the memory system 110 with an error history read command. For example, the host 102 may provide the memory system 110 with the error history read command in order to obtain error history data for failure analysis of the memory system 110. An example of the error history read command has been described with reference to FIG. 7.

In operation S1214, the memory system 110 may obtain raw data of the error history data from the error history region 152 in response to the error history read command, and encrypt the raw data by using the encryptor 170.

In operation S1216, the memory system 110 may provide the host 102 with the encrypted error history data. In operation S1218, the host 102 may determine whether the error history data is valid data, before performing the failure analysis. For example, the host 102 may determine the error history data as invalid data when a size value of the error history data is "0" or when the error history data corresponds to clear-mark data.

When the error history data is invalid data (that is, "NO" in operation S1218), the host 102 may determine that an error has not occurred in the memory system 110, and terminate the operation.

When the error history data is valid data (that is, "YES" in operation S1218), the host 102 may selectively perform operations S1220 and S1222.

For example, when the host 102 has a decryption key provided by the vendor of the memory system 110, the host 102 may decrypt the error history data in operation S1220. In operation S1222, the host 102 may perform the failure analysis of the memory system 110 by using the decrypted error history data.

On the other hand, when the host 102 does not have the decryption key, the host 102 may not perform operations S1220 and S1222. Instead, the host 102 may transmit the encrypted error history data to the vendor of the memory system 110 in response to an external request.

In operation S1230, the host 102 may clear at least one of error history directory entries of the memory system 110. Operation S1230 may include operations S1232 to S1238.

In operation S1232, the host 102 may provide the memory system 110 with an error history clear command. An example of the error history clear command has been described with reference to FIGS. 9A and 9B.

In operation S1234, the memory system 110 may provide the host 102 with a signal indicating that the memory system 110 has normally received the error history clear command, through data in UPIU.

In operation S1236, the memory system 110 may clear at least one error history directory entry in the error history region 152 in response to the error history clear command. The operation of clearing at least one error history directory entry by the memory system 110 in response to the error history clear command has been described in detail with reference to FIGS. 10 to 11B.

In operation S1238, the memory system 110 may provide the host 102 with a completion response to the error history clear command through a response UPIU.

The memory system 110 may be re-driven after the error history directory entry is cleared. If a new error occurs when the memory system 110 is re-driven, the controller 130 may store new error history data in the cleared error history directory entry. For example, the controller 130 may load data of the error history region 152 into the memory 144, and erase the error history region 152. Subsequently, the controller 130 may store the new error history data by modifying clear-mark data included in the loaded data to data for the new error, and programming the modified data into the error history region 152.

The host 102 may obtain the new error history data by providing the re-driven memory system 110 with an error history read command. The vendor of the memory system 110 may easily analyze an error occurring after the memory system 110 is re-driven, by obtaining the new error history data.

As a first example, the vendor of the memory system 110 may reproduce an error by re-driving the memory system 110, and provide the memory system 110 with an error history read command to analyze the reproduced error.

As a second example, a customer company may provide the vendor of the memory system 110 with the memory system 110 while reporting an error occurrence in the memory system 110 included in the data processing system 100. The vendor may complete the failure analysis by using error history data obtained from the memory system 110, remove the error history data by providing an error history clear command, and then return the memory system 110 to the customer company. After the memory system 110 is re-driven, the customer company may provide the vendor with the memory system 110 again while reporting a new error occurrence. The vendor may provide the memory system 110 with an error history read command. When the vendor obtains valid error history data from the memory system 110, the vendor may determine the obtained data as error history data for an error that newly occurs after the memory system 110 is returned to the customer company. The vendor may perform the failure analysis of the memory system 110 again on the basis of the error reported by the customer company and the error history data.

According to an embodiment of the present disclosure, it is possible to provide a memory system that enables a host to easily analyze a failure thereof, and a data processing system including the memory system.

Although a memory system and a data processing system of the present disclosure have been described with reference to the specific embodiments, these are merely examples, and the present disclosure is not limited thereto, and should be interpreted to have the widest scope according to the basic idea disclosed in the present specification. Those skilled in the art may carry out unspecified embodiments by combining and substituting the disclosed embodiments, but these also do not depart from the scope of the present disclosure. In addition, those skilled in the art may easily change or modify the embodiments disclosed on the basis of the present specification, and it is apparent that such changes or modifications also fall within the scope of the present disclosure and the following claims. Furthermore, the embodiments may be combined to form additional embodiments.

What is claimed is:

1. A data processing system comprising:
   a memory system including an error history region, the memory system suitable for storing in the error history region, error history data related to an internal error; and
   a host suitable for obtaining the error history data from the memory system by providing the memory system with an error history read command, performing failure analysis of the memory system on the basis of the obtained error history data, and controlling the memory system to clear at least a portion of the error history region by providing the memory system with an error history clear command,
   wherein the error history region is a memory region that is not able to be accessed with a logical address used by the host,
   wherein the error history region includes a plurality of error history directory entries,
   wherein the memory system is further suitable for:
   loading data of the error history region into an internal volatile memory in response to the error history clear command that designates at least one of the plurality of error history directory entries,
   erasing the error history region,
   modifying the loaded data by modifying data which corresponds to the designated error history directory entry, from the loaded data, and
   programming the modified data into the error history region.

2. The data processing system of claim 1,
   wherein the error history clear command is a read buffer command whose mode is designated as an error history clear mode, and
   wherein the error history clear mode is defined in the read buffer command which is a small computer system interface (SCSI) command.

3. The data processing system of claim 1,
   wherein the host provides the memory system with the error history clear command including a buffer identifier (ID) value corresponding to one of the error history directory entries, and
   wherein the history clear command requests the memory system to clear the one of the error history directory entries.

4. The data processing system of claim 1,
   wherein the host provides the memory system with the error history clear command including a buffer ID value corresponding to all of the error history directory entries,
   wherein the error history clear command requests the memory system to clear all of the error history directory entries, and
   wherein the buffer ID value is included in the error history clear command.

5. The data processing system of claim 1,
wherein the memory system is further suitable for:
modifying the loaded data by removing data which corresponds to the designated error history directory entry, from the loaded data.

6. The data processing system of claim 1,
wherein the memory system is further suitable for:
modifying the loaded data by overwriting at least a partial data piece which corresponds to the designated error history directory entry among the loaded data, with clear-mark data, and
clearing the designated error history directory entry by programming the modified data into the error history region.

7. The data processing system of claim 6, wherein the memory system is further suitable for storing new error history data in the cleared error history directory entry when a new error occurs therein while being re-driven after the error history clear command is processed.

8. The data processing system of claim 7, wherein the memory system stores the new error history data in the cleared error history directory entry by:
loading data of the error history region into an internal volatile memory,
erasing the error history region,
modifying the loaded data by overwriting data which corresponds to the cleared error history directory entry among the loaded data, with the new error history data, and
storing the modified data in the error history region.

9. The data processing system of claim 8,
wherein the host provides the memory system with the error history read command after the memory system is re-driven, and
wherein the host performs, when obtaining valid error history data from the memory system through the error history read command, the failure analysis of analyzing a cause of the newly-occurring error on the basis of the obtained error history data.

10. The data processing system of claim 6, wherein the host determines that the error history region has been cleared and terminates the failure analysis when the error history data obtained through the error history read command is the clear-mark data.

11. The data processing system of claim 1,
wherein the memory system includes a plurality of memory blocks, and
wherein the error history region corresponds to one of the plurality of memory blocks.

12. The data processing system of claim 1, wherein the memory system is a universal flash storage (UFS) based system.

13. A memory system comprising:
a memory device including an error history region; and
a controller suitable for clearing at least a portion of the error history region in response to an error history clear command from a host,
wherein the error history region is a memory region that is not able to be accessed with a logical address used by the host,
wherein the error history region includes a plurality of error history directory entries,
wherein the controller is further suitable for:
loading data of the error history region into an internal volatile memory in response to the error history clear command that designates at least one of the plurality of error history directory entries,
erasing the error history region,
modifying the loaded data by modifying data which corresponds to the designated error history directory entry, from the loaded data, and
programming the modified data into the error history region.

14. The memory system of claim 13,
wherein the error history clear command is a read buffer command whose mode is designated as an error history clear mode, and
wherein the error history clear mode is defined in the read buffer command which is a small computer system interface (SCSI) command.

15. The memory system of claim 13,
wherein the error history clear command includes a buffer identifier (ID) value corresponding to one of the error history directory entries, and
wherein the error history clear command requests the memory system to clear the one of the error history directory entries.

* * * * *